T. W. BROWN.

Coffee Mill.

No. 4,130. Reissued Sept. 27, 1870.

WITNESSES:

J. H. Shumway

A. J. Tibbitts

INVENTOR.

Thos. W. Brown

By his Attorney

John E. Earle

N. PETERS, Photo-Lithographer, Washington, D. C.

UNITED STATES PATENT OFFICE.

THOMAS W. BROWN, OF BOSTON, MASSACHUSETTS, ASSIGNOR TO CHARLES PARKER, OF MERIDEN, CONNECTICUT.

IMPROVEMENT IN COFFEE-MILLS.

Specification forming part of Letters Patent No. 105,545, dated July 19, 1870; Reissue No. 4,130, dated September 27, 1870.

*To all whom it may concern:*

Be it known that I, THOMAS W. BROWN, of Boston, in the county of Suffolk and State of Massachusetts, have invented a new Improvement in Coffee-Mills; and I do hereby declare the following, when taken in connection with the accompanying drawings and the letters of reference marked thereon, to be a full, clear, and exact description of the same, and which said drawings constitute part of this specification, and represent, in—

Figure 1:
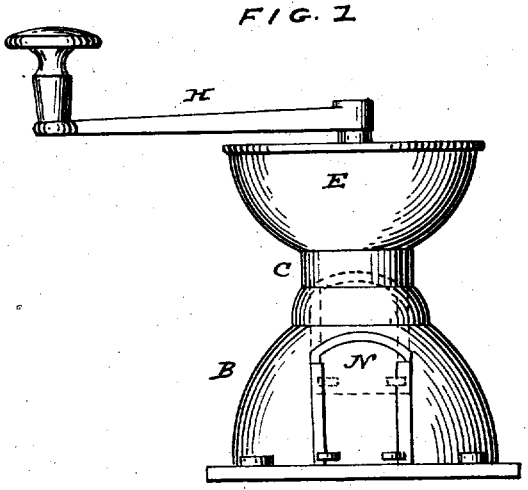
Figure 2:
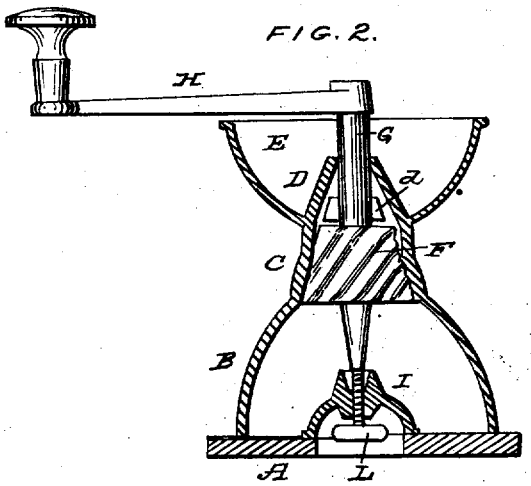

Figure 1, a side view, and in Fig. 2 a vertical central section, of a coffee-mill containing my invention.

This invention relates to an improvement in that class of grinding-mills commonly used for grinding coffee, the object being to produce a cheap and durable mill; and the invention consists in forming the base or receptacle of the mill and the runner-chamber in one and the same piece, whether the hopper be also cast thereon or formed in an independent piece.

A is the bottom, to which the mill is fixed; B, the base or receiving-box; C, the runner-chamber; D, the central support, which extends up into the hopper E, and with one or more recesses, *d*, therethrough, to permit the material to be ground to pass into the runner-chamber.

The base B and runner-chamber C are cast in one and the same piece, and by preference I cast the hopper and central support, D, on the same piece.

The central support, D, is formed of conical shape, so as to constitute a chamber above the runner F, the said runner being fixed to a spindle, G, to which a crank, H, is applied, by means of which the runner is turned.

I is a step fixed to the base, so as to form an opening upon the under side, within which the head L of the adjusting-screw may stand, in order that from the under side of the mill the adjusting-screw may be turned. Upon the end of the adjusting-screw the spindle G rests, as seen in Fig. 2. This arrangement of the step obviates a difficulty experienced in the adjustment of vertical mills, inasmuch as there is no liability to get out of order, and is easily accessible.

I form an opening through one side of the base, into which I fix a slide, *n*, as seen in Fig. 1, through which the material ground may be removed.

The runner and runner-chamber are constructed in the usual manner; but by combining the two parts B and C in one and the same piece of casting the construction is very much simplified, and consequently the cost of manufacture greatly reduced, and still more so when the hopper and central support are cast in the same piece with the parts B and C.

In some cases a brass or copper hopper is preferred to iron, and in such cases the hopper may be formed separately and secured to the runner-chamber.

I claim as my invention—

The combination of the base B and runner-chamber C, cast in one and the same piece of metal, with the vertical runner F, either with or without the hopper E.

THOMAS W. BROWN.

Witnesses:
R. H. EDDY,
S. N. PIPER.